J. S. KIDD & MARY MELVILLE.

Culinary Pots.

No. 5,246. Reissued Jan. 21, 1873.

Witnesses:

A Bennewendorf.

W. A. Graham

Inventor:

J. S. Kidd

Mrs Mary Melville

PER

Attorneys.

AM. PHOTO-LITHOGRAPHIC CO. N.Y. (OSBORNE'S PROCESS.)

UNITED STATES PATENT OFFICE.

JOHN S. KIDD AND MARY L. MELVILLE, OF BROOKLYN, NEW YORK.

IMPROVEMENT IN CULINARY POTS.

Specification forming part of Letters Patent No. 129,034, dated July 16, 1872; reissue No. 5,246, dated January 21, 1873.

*To all whom it may concern:*

Be it known that we, JOHN S. KIDD and Mrs. MARY L. MELVILLE, of Brooklyn, in the county of Kings and State of New York, have invented a new and Improved Culinary Pot, of which the following is a specification:

Our invention consists of a cluster of two or more independent boiling-pots, adapted for use singly or together in one pot-hole of a stove, or in a cluster of separate holes for each pot in the stove-plate, the pots being "nested" or clustered together above the plate by having one or more flattened sides or faces, and fitting snugly together to concentrate them, so that greater boiling capacity can be obtained in a given area of surface, whereby a larger quantity of food can be cooked in separate pots with a fire of a given size than can be done on the cooking-stoves as at present arranged, as will be hereinafter set forth.

Figure 1:
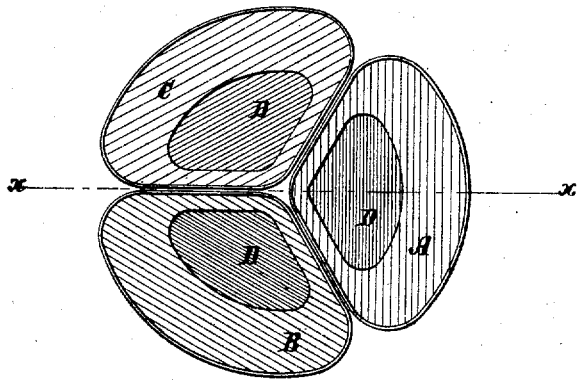
Figure 3:
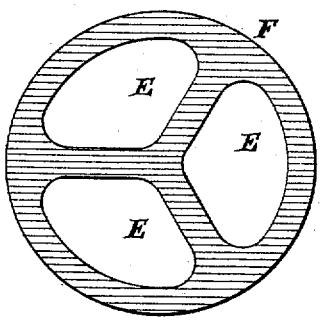
Figure 2:
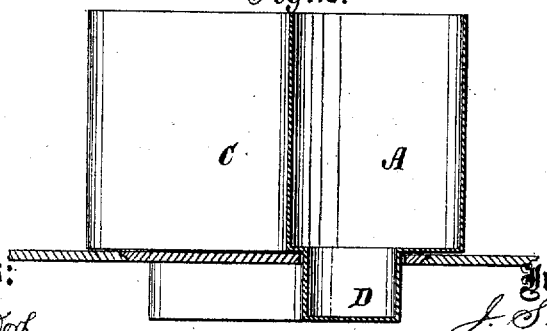

Figure 1 is a top view of a cluster of pots constructed according to our improvement. Fig. 2 is a sectional elevation taken on the line *x x* of Fig. 1; and Fig. 3 is a plan, showing the arrangement of a cluster of special holes on the stove-hole cover or stove-plate adapted for our cluster of pots.

Similar letters of reference indicate corresponding parts.

In this example we have represented the pot divided into three sections and compartments, A B C, which we consider the best practically; but we may have two or more, as preferred. The parts D represent the sections corresponding to the bottom projection of an ordinary pot, extending down through the top plate of the stove; these may be in any approved form. The form of the sectional pots above the plates will vary somewhat by the number of sections in a cluster and to suit the taste or fancy, but it will generally be about as represented in the drawing. The rounded form is given to the corners to facilitate the cleaning of them.

To use our cluster of pots on a stove already in use, we can have them suitably formed to sit in the ordinary pot-hole; but as in this case all the pots of a cluster would have to be used to cover the hole, and it may be desirable sometimes to only use part of the pots of a cluster, we prefer to have a cover for the pot-hole with a special hole for each pot and a cover for each hole, so that we can use only one or more at one and the same time, as we may wish. But in new stoves we may form this cluster of special holes directly in the stove-plate, so as to concentrate the cluster of pots over the central portion of the fire or any particular part of it. This, however, will be more particularly applicable to small parlor cook-stoves having but small fire-surface, and on which it will never be required to use the common pots.

These pots will be very useful with parlor cook-stoves having only one hole; also on ordinary cook-stoves in summer, when it is preferred to have a small fire concentrated under one ordinary pot-hole.

Having thus described our invention, we claim as new and desire to secure by Letters Patent—

1. Two or more pots nested or concentrated in a cluster in the manner described, and adapted for use in a single hole of a stove or in a cluster of special holes, substantially as specified.

2. The combination, with the said cluster of pots, of a cover, F, for ordinary pot-holes, or a stove-plate having a cluster of holes, E, corresponding to the cluster of pots, substantially as specified.

JOHN S. KIDD.
MARY L. MELVILLE.

Witnesses:
W. H. KIDD,
G. MELVILLE.